(No Model.)
E. SUCKOW.
PISTON PACKING.
No. 300,815. Patented June 24, 1884.
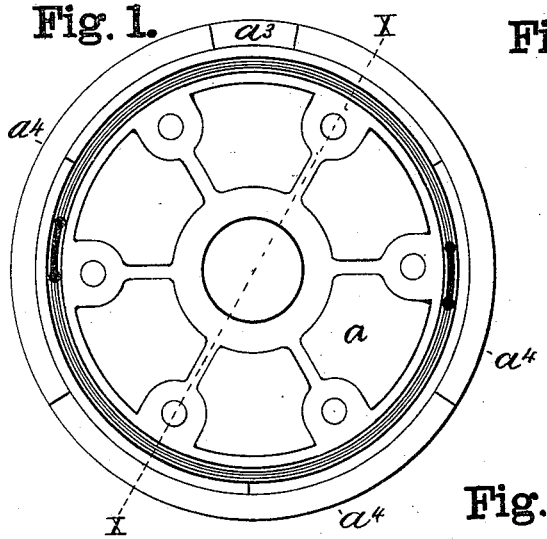
Fig. 1.
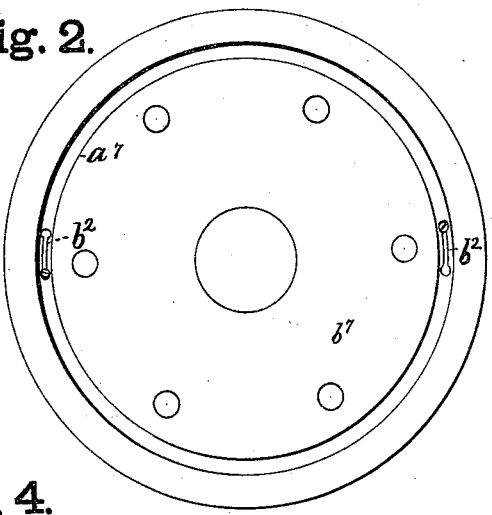
Fig. 2.
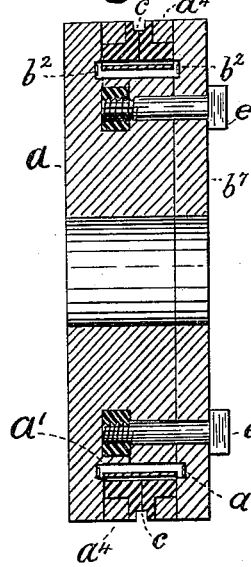
Fig. 3.
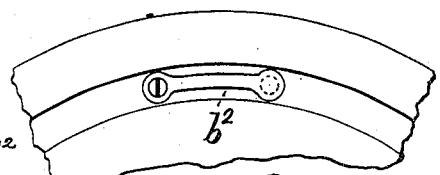
Fig. 4.
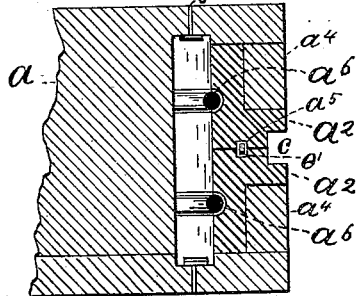
Fig. 6.
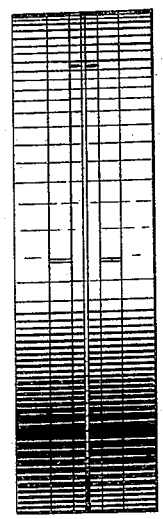
Fig. 5.
Fig. 7.
Fig. 8.
Fig. 9.
Witnesses.
J. H. Caldwell
James Sangster
Inventor.
Edmond Suckow
By James Sangster
Atty.

UNITED STATES PATENT OFFICE.

EDMUND SUCKOW, OF BUFFALO, NEW YORK.

PISTON-PACKING.

SPECIFICATION forming part of Letters Patent No. 300,815, dated June 24, 1884.

Application filed February 16, 1884. (No model.)

*To all whom it may concern:*

Be it known that I, EDMUND SUCKOW, a citizen of the United States, residing in Buffalo, in the county of Erie and State of New York, have invented certain new and useful Improvements in Piston-Packing, of which the following is a specification.

The object of this invention is to provide the means for keeping a tight, close, sensitive, and self-adjusting joint between the piston and the cylinder by the action of the steam, and to act also as a lubricant as the piston moves in the cylinder, all of which will be fully and clearly hereinafter shown and explained by reference to the accompanying drawings, in which—

Figure 1 is a face view of the piston, the follower being left off, so as to expose the rings and inlet-valves. Fig. 2 is an inside view of the follower. Fig. 3 is a section through the piston in line X X, Fig. 1. Fig. 4 is an enlarged portion of the follower, showing an enlarged face view of one of the inlet-valves. Fig. 5 is a side elevation of the piston. Fig. 6 represents an enlarged section through a portion of the piston, cutting through the rings, valves, &c. Fig. 7 is an enlarged inside view of one of the inside rings. Fig. 8 is a side view of the wave-line springs for forcing the rings apart, and Fig. 9 is a top view of the same.

The body of the piston A is in the usual form, and is provided with a portion of smaller diameter, $a'$, to receive the rings $a^2$. These rings are made in sections and laid together, one pair of them, or two, being provided with the stop $a^3$ for keeping the rings $a^4$ in their proper position. (See Fig. 1.) The rings $a^2$ are provided with a circular opening adapted to receive a wave-shaped circular spring, $a^5$, for forcing the said rings out away from each other toward and against the follower and the opposite side of the piston, should any of the parts in any way become loose by wearing. At first all the parts are closely fitted together. The rings $a^2$ are made angular in cross-section, so as to leave a space to receive the rings $a^4$, which cover the joints where the sections of the rings $a^2$ come together. A circular or hoop-shaped spring or springs, $a^6$, (see Fig. 6,) are arranged in a groove to receive them, to force the rings or sections of rings outward to the sides of the cylinder; but a flat or other spring may be used in their place. The follower $b'$ and the opposite side of the piston have a flat recess or groove, $a^7$, (see Figs. 2 and 3,) of any desired depth, into which is fitted one, two, or more spring-valves, $b^2$, secured thereto by screws, or in any other well-known way. (See Figs. 2, 3, 4, and 6.)

$b^3$ represents the openings leading to the valves, which are arranged so that the steam has a free inlet into the piston, but has no outlet, so that when the steam enters the piston it is retained there, and, passing through the openings $b^4$ (see Fig. 7) in the rings $a^2$, passes into the space $c$, (see Fig. 6,) and by its expansive force presses the rings outward, so as to fit closely in the cylinder and against the follower and opposite side of the piston; and it also acts as a lubricant by filling the space $c$, and there is also a partial consumption of steam while lubricating the sides of the cylinder, and this assists in preventing too great a pressure within the piston. In locomotive-engines, or where an ordinary bull-ring or middle ring is used, the steam-passages $b^4$ may be put either on the sides of the bull-ring or on the bull-ring side of the rings. In this case the steam would press the rings each way from the bull-ring. Also, any desired spring or springs may be inserted in the bull-ring, acting against a ring or rings, as previously explained, and in order to insure an even pressure under both rings on each side of the bull-ring a communication is effected from one side or steam chamber to the other by drilling holes through the said bull-ring.

The invention is adapted either for water or steam, and can be used in pumps or in any kind of a cylinder where a close joint is required. Steam-packing as it is now in use cannot be employed or used to an advantage, either in a high or low pressure engine, on account of the cut-off and expansive working of the steam on the one side with the vacuum on the other when the rings do not keep an even pressure against the cylinder, acting therefore to make the bore of cylinder variable, uneven, or unparallel—or, in other words, wider on both ends and smaller in diameter in the center of cylinders—which fault is overcome or prevented by my invention, where an even sensitive self-adjusting and regulating pressure is insured. It will be noticed that the rings are self-adjusting by the action of the steam in the piston. The springs for holding the rings $a^2$ apart, so as to take up the wear, are made in the form of a wave-shaped ring, $a^5$. (See Figs. 8 and 9.) This arrangement preserves an equal pressure all around the groove $e'$, (shown in Figs. 6 and 7,) into which the said spring is laid; but any other well-known spring may be used.

In Fig. 6, $b^3$ represents the inlets to the piston through the valves $b^2$. It will be seen that a valve constructed in this way will freely admit steam into the piston, but will immediately close and prevent it from coming out. $e^2$ represents the usual construction of bolts for holding the follower or side of the piston in place. Of course, the form of valve $b^2$ may be varied. Any other kind of valve in use may be substituted; but the form shown I believe to be the best adapted and cheapest for the purpose. If required, a small portion of softer metal may be put on to insure a close-fitting seat.

It will be perceived that any form of piston now in use can easily be altered to my invention.

The grooves $a^7$ in the piston-sides, into which the spring-valves $b^2$ are secured, prevent the rings $a^2$ from wearing down and leaving a shoulder around their inner edges in the piston and cap, as they pass close to the edge-groove, as shown.

I claim as my invention—

1. In a piston-packing, the rings or sections of rings $a^2$, having projections $b^4$, in combination with one or more valves, $b^2$, set in grooves $a^7$, opposite the inlet-openings for admitting steam to the interior of the piston, and from thence through the perforations $b^4$ to the peripheral space $c$, so as to act as a lubricant to the cylinder and to preserve an equal pressure within the piston, substantially as described.

2. A piston-packing consisting of the rings $a^2$ $a^4$, in combination with a piston and follower and connecting-bolts, the rings $a^2$ being provided with the wave-line springs, substantially as specified, and the grooves $b^4$, for the purposes described.

3. A piston provided with packing-rings, openings $b^3$, springs $a^5$, a spring or springs for forcing the rings apart when required, and openings for admitting steam or water to the space $c$, for the purposes described.

EDMUND SUCKOW.

Witnesses:
 JENNIE M. CALDWELL,
 JAMES SANGSTER.